No. 844,883. PATENTED FEB. 19, 1907.
W. W. LYSINGER.
MACHINE FOR FORMING CONFECTIONS.
APPLICATION FILED JAN. 7, 1907.

2 SHEETS—SHEET 1.

Witnesses
Inventor
William W. Lysinger
by
Foster Freeman Watson
Attorneys

No. 844,883. PATENTED FEB. 19, 1907.
W. W. LYSINGER.
MACHINE FOR FORMING CONFECTIONS.
APPLICATION FILED JAN. 7, 1907.

2 SHEETS—SHEET 2.

Witnesses
J. G. Hinkel
J. J. McCarthy

Inventor
William W. Lysinger
by Foster Freeman & Watson
Attorneys

UNITED STATES PATENT OFFICE.

WILLIAM W. LYSINGER, OF PHILADELPHIA, PENNSYLVANIA.

MACHINE FOR FORMING CONFECTIONS.

No. 844,883.     Specification of Letters Patent.     Patented Feb. 19, 1907.

Application filed January 7, 1907. Serial No. 351,239.

*To all whom it may concern:*

Be it known that I, WILLIAM W. LYSINGER, a citizen of the United States, and a resident of Philadelphia, in the county of Philadelphia and State of Pennsylvania, have invented certain new and useful Improvements in Machines for Forming Confections, of which the following is a specification.

My invention relates to apparatus for forming confections, and more especially to that class of confections termed "drops," and consists in the combination, with a receptacle and means for discharging the material therefrom, of appliances for opening and closing the discharge-orifices and for regulating the downward flow of the material discharged and the shape of the streams of discharge, as fully set forth hereinafter and as illustrated in the accompanying drawings, in which—

Figure 1:
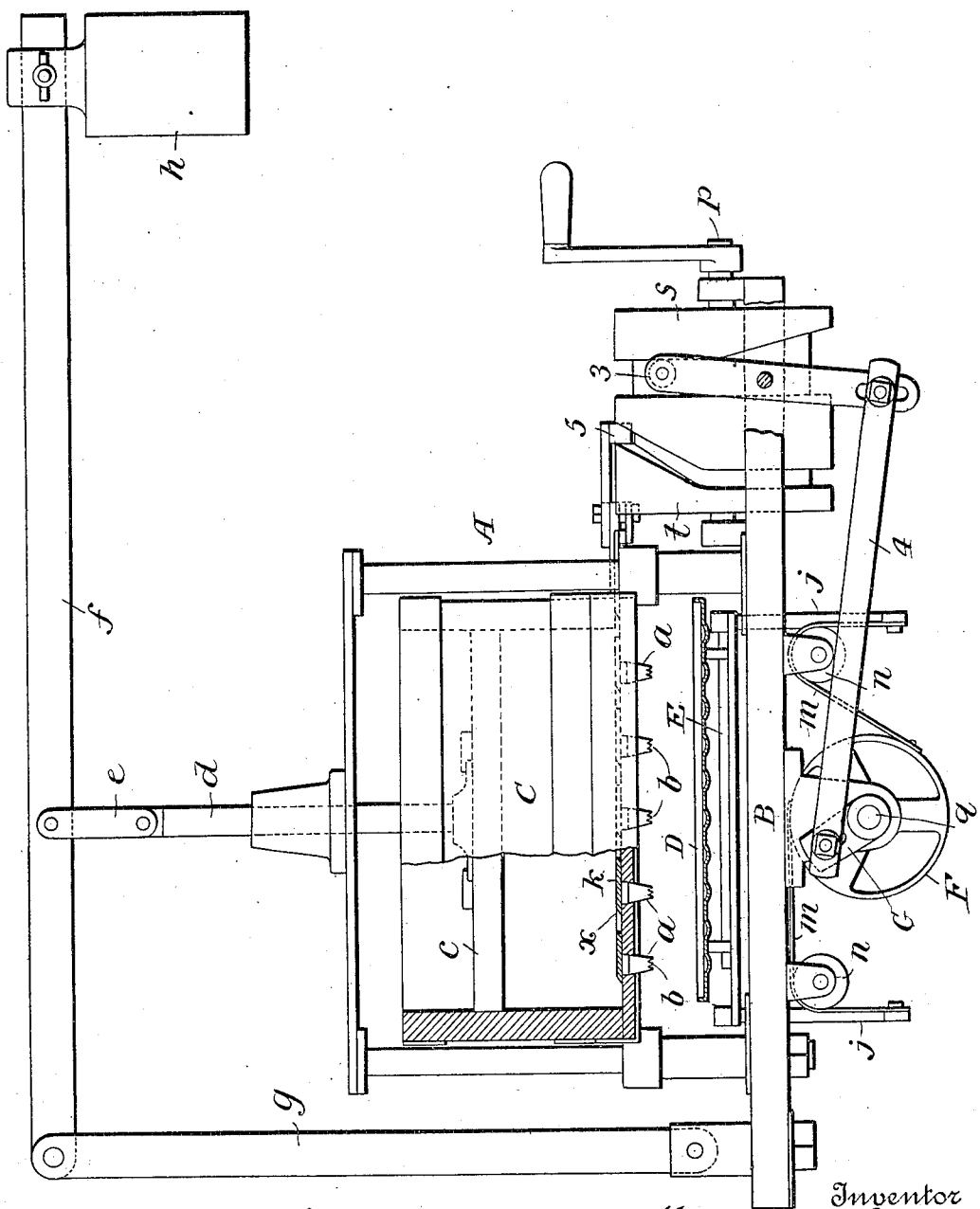
Figure 2:
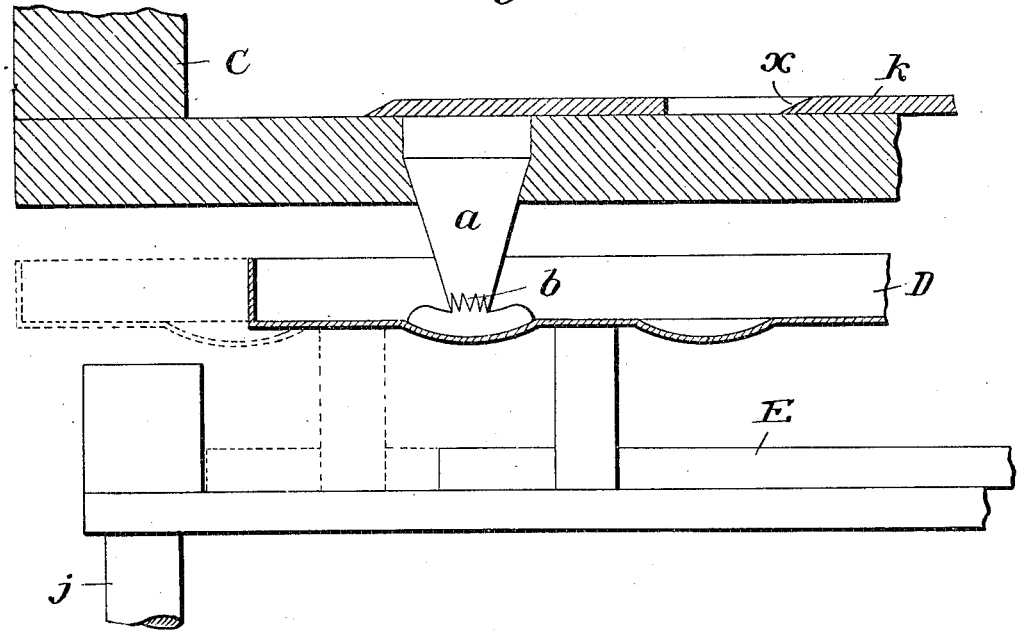

Figure 1 is an elevation in part section of an apparatus embodying my invention; Fig. 2, an enlarged section illustrating one of the nipples and means for detachably connecting it with the receptacle, and Fig. 3 a sectional view illustrating a part of the mold and one of the drops as produced by the mold.

Figure 3:
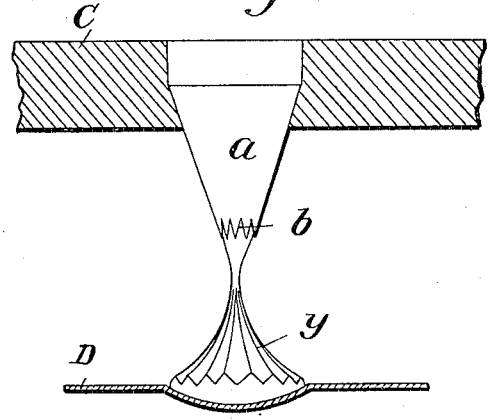

The frame A is of any suitable construction to support the operating parts and is itself supported upon a table B. A box or reservoir C is supported by the frame above the table and has in the bottom perforations from which extend nipples $a$, each of which is in the form of an inverted cone cut away at the sides, so as to form a series of fingers $b$, as shown in Figs. 2 and 3. Within the box C fits closely, but so as to slide freely, a follower $c$, which is suitably weighted—as, for instance, by means of a rod $d$, connected by a link $e$ to a lever $f$, pivoted to an upright $g$ upon the table, and having an adjustable weight $h$ at the outer end. Within the box above the perforated bottom slides a cut-off plate $k$, having a series of openings beveled from one side to form knife-edges $x$, and with this cut-off plate, which extends outward from the box, is combined suitable means whereby it may be moved laterally to cover or uncover the openings in the bottom of the box.

Above the table B is supported a suitable mold D, which preferably, as shown, rests in a carriage E, from which extend downwardly guide-bars $j$, and these are connected to the ends of straps $m$, passing over guide-pulleys $n$, and to the periphery of a shifting-pulley F on a shaft $q$, turning in brackets below the table, and to the shaft is secured an operating-arm G. By swinging said arm the pulley F is turned so as to raise and lower the carriage and its mold.

In operating the apparatus the box is filled with the chocolate paste or other material to be molded, and the pressure of the weight $h$ tends to force the said material out through the openings at the bottom of the box and through the nipples $a$, the carriage and mold being primarily lifted, so that the mold is close to the nipples as the material begins to pass downward through the latter, which results when the cut-off plate is shifted to the right to uncover the openings in the bottom of the box, as shown in Fig. 2. As the material flows downward from the nipples the mold is also drawn downward, preferably at a greater speed than the flow of the material, which is cut off by shifting the cut-off plate after the proper amount has been discharged from the box, with the result that the material as discharged from each nipple is drawn downward and caused to contract, as in Fig. 3, and as it is thus drawn from the nipples forms what is termed a "blossom"—that is, a chocolate drop which is in the form of a knob or disk at the lower end and approximately cone-shaped above, with a series of diverging ribs $y$, Fig. 3, resulting from the flow of the material between the fingers $b$ of the nipples.

It will be evident that according to the rate of discharge and the rate of downward movement of the mold the shape of the article formed will be modified, although as a result of the general operations described the shape will be approximately that illustrated in the drawings.

The lever G and the cut-off plate may be shifted by hand according to the judgment of the operator; but in some cases it is preferable to insure uniform relation of movement between the two, in which case they may be connected with any suitable unison connections. As shown, there is a shaft $p$ mounted in bearings on the table and carrying a disk $q$, having a cam-face bearing on a roller 3 of a lever K, pivoted to the frame and connected by a rod 4 with the arm G. A suitably-formed cam $t$ is also upon the shaft $p$ and operates upon a roller 5 on an arm 6, extending from the cut-off plate. By turning the shaft $p$ by hand or otherwise the requisite movements in proportion are imparted to the die-carrier and the cut-off plate.

The die D may of course be supported directly upon the guide-bars $j$ and may be of any suitable shape, with any suitable depressions so as to impart to the heads of the articles the form desired. Generally the depressions in the die-plate are closer together than the nipples can be placed. I therefore set the mold so as to be shifted after one set of depressions are filled to an extent to bring the other set below the nipples. A stop-bar 8 or other means determines the extent of this shifting movement. It will also be evident that any suitable means may be employed for pressing the material out of the box instead of the follower and weighted levers described.

It is desirable from time to time to change the character and size of the articles produced, and therefore the openings in the bottom of the box are flaring to permit the conical nipples to fit and be held therein, while permitting their ready removal to replace them with nipples of a different character.

If desired the mold may be stationary and the box vertically movable.

Without, therefore, limiting myself to the precise construction and arrangement of parts shown, I claim as my invention—

1. The combination in a machine for forming confections, of a receptacle provided with nipples having terminal fingers $b$, a cut-off plate controlling the flow through said nipples, a mold arranged below the nipples, and means for shifting the cut-off plate and raising and lowering the mold, substantially as set forth.

2. The combination with the receptacle having openings and nipples with fingers $b$ extending therefrom, and a movable die-plate, of a vertically-movable carriage adapted to support a mold, and means for raising and lowering the carriage.

3. The combination of the receptacle, its openings, nipples, and cut-off plate, a vertically-movable mold, and means for moving the mold and cut-off plate in unison, for the purpose set forth.

4. The combination with the receptacle, its openings, nipples and cut-off plate, of a mold, guide-bars $j$, a pulley $f$, flexible connections between the pulley and guide-bars, and means for oscillating the pulley.

5. The combination in a machine for forming confections, of a receptacle provided with a perforated bottom and nipples communicating with the perforations, a cut-off plate controlling the flow through the nipples, a mold arranged below the nipples, a shaft, and means whereby to shift the cut-off plate and raise and lower the mold by the turning of said shaft.

6. The combination with the receptacle, its nipples and cut-off plate, of a mold arranged below the nipples, means for shifting the cut-off plate and raising and lowering the mold arranged to uncover the openings after the mold is raised and to lower the mold more rapidly than the material can pass through the nipples.

7. The combination with the receptacle, nipples and means for controlling the flow through the nipples, of a mold having series of recesses greater in number than the series of nipples, a support for the mold upon which the latter can be shifted to bring either series of recesses beneath the nipples, and means for raising and lowering the support.

8. The combination with the mold and elevating and lowering means, of a receptacle having a bottom with flaring perforations, and hollow nipples of conical form adapted to said perforations, as set forth.

9. The combination with the receptacle, its nipples, mold and shaft, connections for raising and lowering the mold, and cut-off plate within the mold, of a shaft carrying cams, one engaging a projection upon an extension of the cut-off plate, and the other the means for rocking the mold-elevating shaft, as set forth.

10. The combination with the receptacle, nipples, and a vertically-movable mold-carrier below the nipples having downwardly-extending bars $j$, of a shaft and pulley carried thereby, guide-wheels $n$, and straps passing from the periphery of the pulley and around the guide-wheels and connected with said bars, for the purpose described.

In testimony whereof I affix my signature in presence of two witnesses.

WM. W. LYSINGER.

Witnesses:
WM. T. DOUGHTEN,
LEA P. TERRY.